US012439545B2

(12) United States Patent
Liu et al.

(10) Patent No.: US 12,439,545 B2
(45) Date of Patent: Oct. 7, 2025

(54) SUPERCOMPUTING SERVER (71) Applicant: SHENZHEN MICROBT ELECTRONICS TECHNOLOGY CO., LTD., Guangdong (CN)

(72) Inventors: Fangyu Liu, Guangdong (CN); Yuefeng Wu, Guangdong (CN); Yang Gao, Guangdong (CN); Qian Chen, Guangdong (CN); Hongyan Ning, Guangdong (CN); Zuoxing Yang, Guangdong (CN)

(73) Assignee: SHENZHEN MICROBT ELECTRONICS TECHNOLOGY CO., LTD., Guangdong (CN)

( * ) Notice: Subject to any disclaimer, the term of this patent is extended or adjusted under 35 U.S.C. 154(b) by 186 days.

(21) Appl. No.: 18/036,959

(22) PCT Filed: Jun. 11, 2021

(86) PCT No.: PCT/CN2021/099705
§ 371 (c)(1),
(2) Date: May 15, 2023

(87) PCT Pub. No.: WO2022/105205
PCT Pub. Date: May 27, 2022

(65) Prior Publication Data
US 2023/0422423 A1 Dec. 28, 2023

(30) Foreign Application Priority Data
Nov. 20, 2020 (CN) .......................... 202022701115.7

(51) Int. Cl.
H05K 7/14 (2006.01)
(52) U.S. Cl.
CPC .......... H05K 7/1489 (2013.01); H05K 7/1492 (2013.01)

(58) Field of Classification Search
CPC .. H05K 7/1489; H05K 7/1492; H05K 7/1487; G06F 1/18
See application file for complete search history.

(56) References Cited

U.S. PATENT DOCUMENTS 9,095,070 B2 * 7/2015 Ross .................... G11B 33/128
9,462,725 B2 * 10/2016 Jau ........................ H05K 7/1487
(Continued)

FOREIGN PATENT DOCUMENTS

CN 202025265 U 11/2011
CN 103165160 A 6/2013
(Continued)

OTHER PUBLICATIONS

International Search Report for PCT/CN2021/099705 mailed on Sep. 10, 2021 (6 pages including English Translation).
(Continued)

Primary Examiner — Imani N Hayman
Assistant Examiner — Hung Q Dang
(74) Attorney, Agent, or Firm — Merchant & Gould P.C.

(57) ABSTRACT

The present application relates to a supercomputing server including: a case housing defining an accommodating space and provided with a mounting hole allowing communication between the accommodating space and an external environment; and a control unit disposed at an end portion of the case housing corresponding to the mounting hole and configured to be moved into or out of the accommodating space through the mounting hole. After the control unit is disassembled from the case housing, the control unit may be moved out of the accommodating space through the mounting hole at the end portion of the case housing to maintain the control unit. After the maintenance, the control unit is
(Continued)

moved into the accommodating space through the mounting hole, and the control unit is fixed at the end portion of the case housing.

14 Claims, 4 Drawing Sheets

(56) References Cited

U.S. PATENT DOCUMENTS

| | | | |
|---|---|---|---|
| 2011/0116226 A1 | 5/2011 | Yang | |
| 2013/0154457 A1 | 6/2013 | Kuo et al. | |
| 2014/0293523 A1 | 10/2014 | Jau et al. | |
| 2015/0208543 A1* | 7/2015 | Chen .................... | H05K 7/1489 |
| | | | 361/679.39 |

FOREIGN PATENT DOCUMENTS

| | | |
|---|---|---|
| CN | 104076886 A | 10/2014 |
| CN | 211718840 U | 10/2020 |

OTHER PUBLICATIONS

Written Opinion for PCT/CN2021/099705 mailed on Sep. 10, 2021 (3 pages).

\* cited by examiner

SUPERCOMPUTING SERVER

CROSS-REFERENCE TO RELATED APPLICATIONS

This application is a National Stage Application of International Application No. PCT/CN2021/099705, filed 11 Jun. 2021, which claims benefit of Ser. No. 202022701115.7, filed 20 Nov. 2020 in China, and which applications are incorporated herein by reference. To the extent appropriate, a claim of priority is made to each of the above disclosed applications.

TECHNICAL FIELD

The present application relates to the field of virtual data processing equipment technologies, and in particular, to a supercomputing server.

BACKGROUND

In recent years, with the continuous development of network data applications and AI applications, an increasingly large number of supercomputing servers are deployed to meet the needs of computing power. Operators need to routinely maintain and repair a supercomputing server to ensure the normal operation of the supercomputing server. As a component for the control and external communication of a supercomputing server, a control board is one of the important components of the supercomputing server. In an existing design solution of a supercomputing server, a control board is disposed inside the equipment. When the control board needs to be maintained, the supercomputing server needs to be disassembled first to take out the control board. In a scenario of deploying a large number of supercomputing servers, the workload of maintaining the control boards is very heavy. When a control board is maintained in a manner of disassembling the supercomputing server, the operation process is complex, resulting in lowered maintenance efficiency and inconvenient use.

SUMMARY

In view of these, for addressing the problem of complex operations when maintaining the control board due to the supercomputing server needs to be disassembled first to take out the control board according to the prior art, a supercomputing server is provided that is easy to maintain.

A supercomputing server is provided that comprises:
a case housing defining an accommodating space and provided with a mounting hole allowing communication between the accommodating space and an external environment; and
a control unit disposed at an end portion of the case housing corresponding to the mounting hole and configured to be moved into or out of the accommodating space through the mounting hole.

In an embodiment, the case housing comprises a case bottom shell, a first end plate, a second end plate, and a case cover plate, the first end plate and the second end plate are disposed oppositely to each other at two sides of the case bottom shell and cover three side edges of the case bottom shell that are coplanar and connected in sequence, the case cover plate is coupled to the case bottom shell, the first end plate, and the second end plate in an enclosed manner to define the accommodating space, and the mounting hole is provided in the first end plate.

In an embodiment, the control unit comprises a control board and a fix plate, the control board is disposed to the fix plate, the fix plate is detachably coupled to the first end plate, and the fix plate is configured to drive the control board to be moved into or out of the accommodating space along the mounting hole.

In an embodiment, the fix plate comprises a first plate body and a second plate body that are vertically arranged, the control board is mounted on the first plate body, and the second plate body is detachably coupled to the first end plate.

In an embodiment, the case housing further comprises a backplane, the backplane is disposed on an inner wall of the mounting hole, the backplane partially corresponds to the second plate body, and the backplane is detachably coupled to the second plate body.

In an embodiment, the control unit further comprises a guide assembly, and the guide assembly is respectively disposed on an inner wall of the mounting hole and on the fix plate and is configured to guide the moving of the fix plate into or out of the mounting hole.

In an embodiment, the guide assembly comprises a first guide member and a second guide member, the first guide member is disposed on the inner wall of the mounting hole, the second guide member is disposed on an edge of the fix plate, and the first guide member slidably fits the second guide member.

In an embodiment, the first guide member is a guide chute, the second guide member is a guide rail, and the guide rail is movably mounted in the guide chute; or
 the first guide member is a slide block, the second guide member is a guide rail, and the guide rail is movably mounted to the slide block; or
 the first guide member is a guide rail, the second guide member is a guide chute, and the guide rail is movably mounted in the guide chute.

In an embodiment, a limit member is further provided on the first end plate, the limit member is disposed on the first guide member and is located at an outer side of the accommodating space, and the limit member is disposed abutting against the fix plate to limit a movement stroke of the fix plate.

In an embodiment, a through hole penetrating the second plate body is provided in the second plate body, and the through hole corresponds to an external interface and an electronic device of the control board.

In an embodiment, the supercomputing server further comprises electronic units mounted in the accommodating space of the case housing; and the electronic units comprise a computation board and a power supply, and the computation board and the power supply are respectively electrically coupled to the control unit with connecting cables.

In an embodiment, the control unit further comprises a fix element, the fix element is mounted onto the first end plate through the fix plate, and the fix plate is detachably coupled to the first end plate.

In an embodiment, the first plate body is disposed in parallel to a bottom plate of the case bottom shell, and the second plate body is disposed in parallel to the first end plate.

In an embodiment, the backplane is disposed protruding away from the inner wall of the mounting hole, and projections of the backplane and the second plate body on the first end plate are partially overlapped.

In an embodiment, the limit member is disposed, on the first guide member and protrudes toward the outer side of the accommodating space.

With the foregoing embodiments, at least the following technical effects are achieved according to the present application:

According to the supercomputing servers of the present application, the control unit is located at an end portion of the case housing, and the control unit is disposed corresponding to the mounting hole of the case housing. After the control unit is detached from the case housing, the control unit may be removed out of the accommodating space through the mounting hole at the end portion of the case housing, so that the control unit can be maintained. After the maintenance is completed, the control unit is moved into the accommodating space through the mounting hole, and the control unit is fixed at the end portion of the case housing. By moving the control unit into or out of the accommodating space through the mounting hole, the disassembly of the control unit is implemented, thereby effectively resolving the problem of complex operations when maintaining the control board according to the prior art that needs to disassemble the supercomputing server to take out the control board, simplifying the maintenance process of the control unit, facilitating the maintenance of the control unit, improving the maintenance efficiency, and facilitating the use thereof.

Wherein: 100, supercomputing server; 110, case housing; 111, case bottom shell; 112, first end plate; 1121, mounting hole; 113, second end plate; 114, case cover plate; 115, backplane; 1151, threaded hole; 120, control unit; 121, control board; 1211, external interface; 1212, indicator light; 1213, switch; 122, fix plate; 1221, first plate body; 1222, second plate body; 12221, through hole; 123, fix element; 124, guide assembly; 1241, first guide member; 1242, second guide member; 125, fixing stud; 130, electronic unit; 131, computation board; 132, power supply.

DETAILED DESCRIPTION OF EMBODIMENTS

To make the foregoing objects, features and advantages of the present application more obviously easy to understand, detailed description is made to specific implementations of the present application below with reference to the accompanying drawings. In the following description, many specific details are described for fully understanding the present application. However, it is to be noted that the present application can be implemented in many other manners than those described herein. various changes or modifications can be made by those skilled in the art without departing from the spirit of the present application. Therefore, the present application shall not be limited to the specific embodiments disclosed below.

In the description of the present application, it should be understood that, orientations or position relationships indicated by terms such as "center", "longitudinal", "transverse", "length", "width", "thickness", "up", "down", "front", "back", "left", "right", "vertical", "horizontal", "top", "bottom", "inner", "outer", "clockwise", "counterclockwise", "axial", "radial", "circumferential", or the like are orientations or position relationships described on basis of the accompanying drawings, and are merely used for the ease of describing the present application and simplifying the description, and are not intended to indicate or imply that the related apparatus or element should have a particular orientation or be configured and operated in a particular orientation, and therefore, should not be construed as a limitation on the present application.

In addition, the terms "first", "second", or the like are used merely for the purpose of description, and shall not be construed as indicating or implying relative importance or implying a quantity of indicated technical features. Therefore, the feature leaded by "first" or "second" can explicitly or implicitly include at least one such feature. In the descriptions of the present application, unless otherwise specified, "a plurality" means at least two, for example, two, three or more.

In the present application, unless explicitly specified or limited otherwise, the terms "mount", "couple", "connect", and "fix" should be understood broadly, for example, it may be a fixed connection, a detachable connection or an integral connection; or it may be a mechanical connection or an electrical connection; or it may be a direct connection, an indirect connection through an intermediary, or communication between internal parts of two elements or mutual action relationship between two elements, unless specified otherwise explicitly. For persons of ordinary skills in the art, specific meanings of the above-mentioned terms in the present application can be readily understood as appropriate according to specific situations.

In the present application, unless explicitly specified or limited otherwise, a first feature described as being "on" or "under" a second feature may be such a case that the first feature is in direct contact with the second feature, or that the first feature is in indirect contact with the second feature with an intermediate medium. Moreover, a first feature described as being "over" or "above" the a second feature may be such a case that the first feature is directly above or obliquely above the second feature, or simply indicates that a horizontal height of the first feature is higher than that of the second feature. A first feature described as being "under" or "below" a second feature may be such a case that the first feature is directly below or obliquely below the second feature, or simply indicates that a horizontal height of the first feature is lower than that of the second feature.

It may need to be noted that when a component is referred to as being "fixed to" or "disposed on" an other component, the component may be directly on the other component, or an intervening component may be present. When a component is considered to be "coupled to" an other component, the component may be directly coupled to the other component, or an intervening component may be present. The terms "vertical", "horizontal", "upper", "down", "left", "right" and similar expressions used in this specification are only for purposes of illustration, and are not intended to indicate it is the only implementation.

Referring to FIG. 1 to FIG. 4, a supercomputing server 100 is provided according to the present application. The supercomputing server 100 is used to process data to implement corresponding functions. It may be understood that the supercomputing server 100 may be a data processing device of any other type.

To ensure the data processing capability, a conventional supercomputing server needs to be routinely maintained and repaired, and sometimes the control board of the supercomputing server needs to be maintained. However, during the maintenance of the control board at present, the supercomputing server needs to be disassembled first to take the control board out for maintenance, resulting in a complex operation process. Therefore, a novel supercomputing server 100 is proposed according to the present application, which can facilitate maintenance and improve maintenance efficiency. Specific structure(s) of the supercomputing server 100 will be described below in detail.

In an embodiment, the supercomputing server 100 includes a case housing 110 and a control unit 120. The case housing 110 defines an accommodating space, and is provided with a mounting hole 1121 allowing communication between the accommodating space and an external environment. The control unit 120 is disposed at an end portion of the case housing 110 corresponding to the mounting hole 1121 so that the control unit 120 can be moved into or out of the accommodating space through the mounting hole 1121.

The case housing 110 is a main body casing of the supercomputing server 100 and is used for mounting various components of the supercomputing server 100. Moreover, the case housing 110 provides protection to prevent the entry of external dust and debris, and in addition can prevent an external object from touching the components in the case housing 110 to ensure the reliability of the supercomputing server 100.

Figure 1:
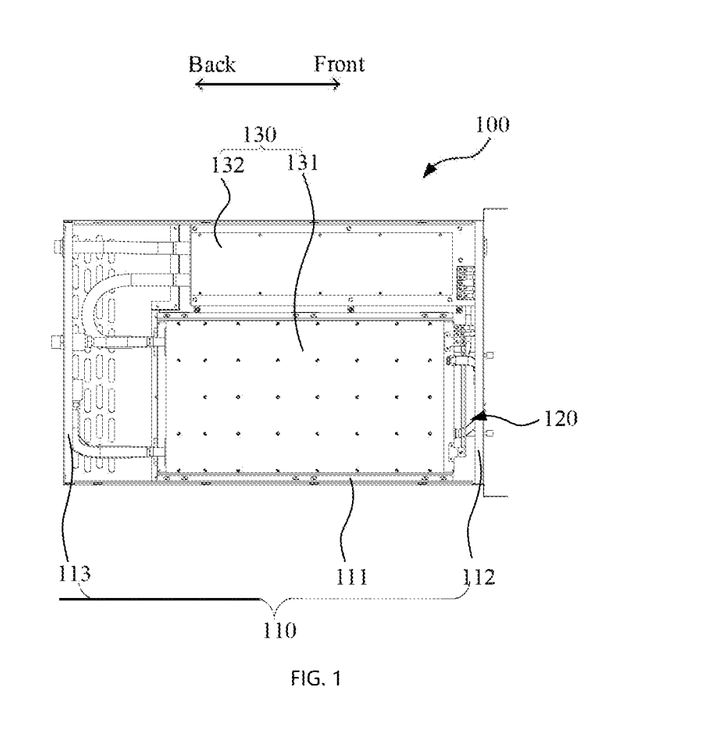
FIG. 1 is a top view of a supercomputing server according to an embodiment of the present application with a case cover plate removed.

The case housing 110 is a hollow structure. A hollow part of the case housing 110 is the accommodating space for mounting various components of the supercomputing server 100. Moreover, the mounting hole 1121 is provided at a front end of the case housing 110. The mounting hole 1121 allows communication between the accommodating space of the case housing 110 and the external environment. The front end and a rear end of the case housing 110 are shown in FIG. 1.

The control unit 120 is the main control component of the supercomputing server 100. The control unit 120 is detachably mounted on the case housing 110 and is located at an edge position of the accommodating space, so that the control unit 120 can be easily detached from the case housing 110. It is to be understood that for the control unit 120 which is detachable, it can be such a case that after the control unit 120 is moved out through the mounting hole 1121, the control unit 120 may be still connected to the case housing 110, or it can be such a case that the control unit 120 may be completely separated from the case housing 110. Both the foregoing two forms of the control unit 120 can implement the maintenance of the control unit 120. In addition, the control unit 120 is disposed corresponding to the mounting hole 1121. The mounting hole 1121 is a passage for the control unit 120 to be moved into or out of the accommodating space of the case housing 110. The control unit 120 may be moved into the accommodating space through the mounting hole 1121 or may be moved out of the accommodating space through the mounting hole 1121.

Specifically, when the control unit 120 needs to be maintained, the control unit 120 is disassembled from the case housing 110, and then the control unit 120 is moved out of the accommodating space of the case housing 110 through the mounting hole 1121. As such, the control unit 120 can be maintained. After the maintenance of the control unit 120 is completed, the control unit 120 is pushed into the accommodating space of the case housing 110 through the mounting hole 1121, and the control unit 120 is fixed to the case housing 110 to prevent the position of the control unit 120 from changing and ensure the working reliability of the control unit 120.

In an embodiment, the supercomputing server 100 further includes an electronic unit 130. The electronic unit 130 is mounted in the accommodating space of the case housing 110. The electronic unit 130 includes a computation board 131 and a power supply 132. The computation board 131 and the power supply 132 are electrically coupled to the control unit 120 with connecting cables. The electronic unit 130 is the main working component of the supercomputing server 100, and is used to implement the relevant performance of the supercomputing server 100. The computation board 131 and the power supply 132 of the electronic unit 130 are electrically coupled to the control unit 120 with the connecting cables for related communication and control. The control unit 120 controls the power supply 132 to supply power and controls the computation board 131 to work.

Figure 2:
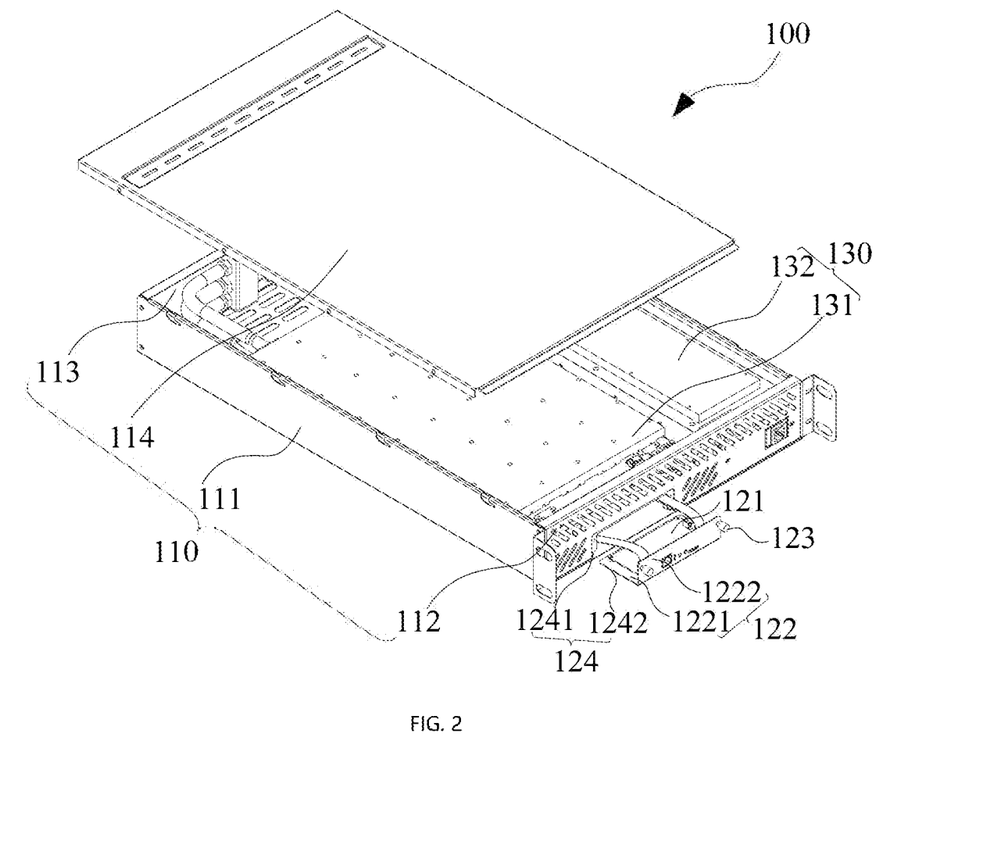
FIG. 2 is a three-dimensional view of the supercomputing server shown in FIG. 1, where a control unit is pulled out of a case housing.

In an embodiment, as shown in FIG. 2, the case housing 110 includes a case bottom shell 111, a first end plate 112, a second end plate 113, and a case cover plate 114. The first end plate 112 and the second end plate 113 are disposed oppositely at two sides of the case bottom shell 111 and each cover three side edges of the case bottom shell 111 that are coplanar and coupled in sequence. The case cover plate 114 is coupled to the case bottom shell 111, the first end plate 112, and the second end plate 113 in an enclosed manner to define the accommodating space. The mounting hole 1121 is provided in the first end plate 112.

The case bottom shell 111, the first end plate 112, and the second end plate 113 are disposed as a U-shaped structure. The first end plate 112 and the second end plate 113 are respectively coupled to two side surfaces of the case bottom shell 111, so that the case housing 110 forms a case with an opening at the top. The case cover plate 114 covers the case housing 110 to form a closed accommodating space for accommodating the control unit 120 and the electronic unit 130. Optionally, the edges of the case bottom shell 111, the first end plate 112, the second end plate 113, and the case cover plate 114 are all provided with flanges, and the detachable coupling is implemented through the cooperation of the flanges and screws, to facilitate the mounting of the case housing 110.

As shown in FIG. 1, the first end plate 112 is located at a front side of the case housing 110. The second end plate 113 is located at a rear side of the case housing 110. The mounting hole 1121 is provided in the first end plate 112. The control unit 120 is disposed close to the first end plate 112 and opposite to the mounting hole 1121 on the first end plate 112, so that the control unit 120 can be easily moved into or out of the accommodating space of the case housing 110 through the mounting hole 1121. Optionally, the mounting hole 1121 is located at the bottom of the first end plate 112, so that the control unit 120 is supported by the case housing 110 to prevent the control unit 120 from falling under the force of gravity. Certainly, in other embodiments of the present application, the mounting hole 1121 may be provided in a top or middle region of the first end plate 112.

Figure 4:
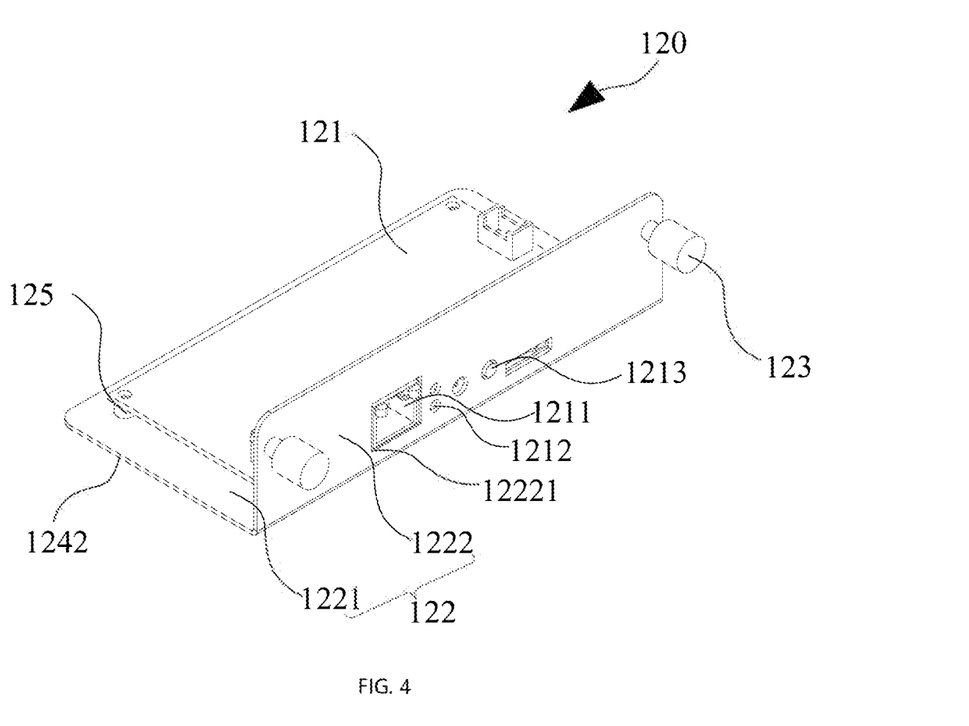
FIG. 4 is a three-dimensional view of a control unit of the supercomputing server shown in FIG. 1.

In an embodiment, as shown in FIG. 4, the control unit 120 includes a control board 121 and a fix plate 122. The control board 121 is disposed at the fix plate 122. The fix plate 122 is detachably coupled to the first end plate 112. The fix plate 122 can drive the control board 121 to be moved into or out of the accommodating space along the mounting hole 1121.

The control board 121 is a control component in the control unit 120. The control board 121 is electrically coupled to the computation board 131 and the power supply 132 with connecting cables. The fix plate 122 is used to carry the control board 121 and drive the control board 121 to be moved into or out of the accommodating space through the mounting hole 1121. Moreover, the fix plate 122 may be detachably coupled to the first end plate 112. Optionally, the detachable connection may comprise a snap connection, a screw connection or the like.

After the fix plate 122 is fixed to the first end plate 112, the fix plate 122 may block the mounting hole 1121 of the first end plate 112 to prevent debris or the like from entering through the mounting hole 1121, thereby ensuring the safety of use. When the control unit 120 needs to be removed out, the fix plate 122 is directly disassembled from the first end plate 112. In this case, the fix plate 122 can be dragged outward to drive the control board 121 to move out of the accommodating space through the fix plate 122, so as to facilitate the maintenance for the control board 121 on the fix plate 122. After the maintenance of the control board 121 is completed, the fix plate 122 is pushed inward, and the fix plate 122 can drive the control board 121 to move into the accommodating space. After the fix plate 122 is moved in place, the fix plate 122 covers the mounting hole 1121 of the first end plate 112. In this case, the fix plate 122 can be fixed on the first end plate 112.

Optionally, the control unit 120 further includes a fix element 123. The fix element 123 is mounted to the first end plate 112 through the fix plate 122, to implement detachable coupling of the fix plate 122 with the first end plate 112. For example, the fix element 123 is a captive screw. The captive screw is used to couple the fix plate 122 and the first end plate 112 to facilitate the disassembly and assembly of the control unit 120. The fix element 123 may be manually loosened or locked without tools, thereby facilitating the disassembly and assembly of the control unit 120.

In an embodiment, the fix plate 122 includes a first plate body 1221 and a second plate body 1222 that are vertically disposed. The control board 121 is mounted on the first plate body 1221. The second plate body 1222 is detachably coupled to the first end plate 112. The first plate body 1221 is disposed in a horizontal direction and is disposed in parallel to a bottom plate of the case bottom shell 111. The second plate body 1222 is disposed in a vertical direction and disposed in parallel to the first end plate 112. It may be understood that after the second plate body 1222 is mounted in the mounting hole 1121, an outer surface of the second plate body 1222 is coplanar with an outer surface of the first end plate 112. That is, the second plate body 1222 is embedded in the mounting hole 1121 of the first end plate 112, and the second plate body 1222 is prevented from protruding to ensure a flat appearance. The cross-sectional area of the second plate body 1222 is slightly smaller than the cross-sectional area of the mounting hole 1121, so that a mounting gap can be reserved to facilitate the mounting and disassembly of the fix plate 122.

The control board 121 is detachably mounted on the first plate body 1221. When the control board 121 needs to be maintained, the fix element 123 is first loosened, the control unit 120 is pulled out, the fix plate 122 drives the control board 121 to be moved out of the accommodating space, and cable connector(s) on the control board 121 is pulled out, so that the control unit 120 is completely moved out through the mounting hole. In this case, the control board 121 of the control unit 120 can be maintained. Moreover, after maintenance, the control board 121 is mounted onto the first plate body 1221. Cable connector(s) is coupled to the control board 121. The fix plate 122 is then pushed into the accommodating space, and the second plate body 1222 is fixed to the first end plate 112 with the fix element 123.

Optionally, a fixing stud 125 is disposed on the first plate body 1221. The control board 121 is detachably mounted on the first plate body 1221 by the fixing stud 125. Optionally, the first plate body 1221 and the second plate body 1222 are integrally formed. Certainly, in other embodiments of the present application, the first plate body 1221 and the second plate body 1222 may be detachably coupled or fixedly coupled by welding or the like.

Figure 3:
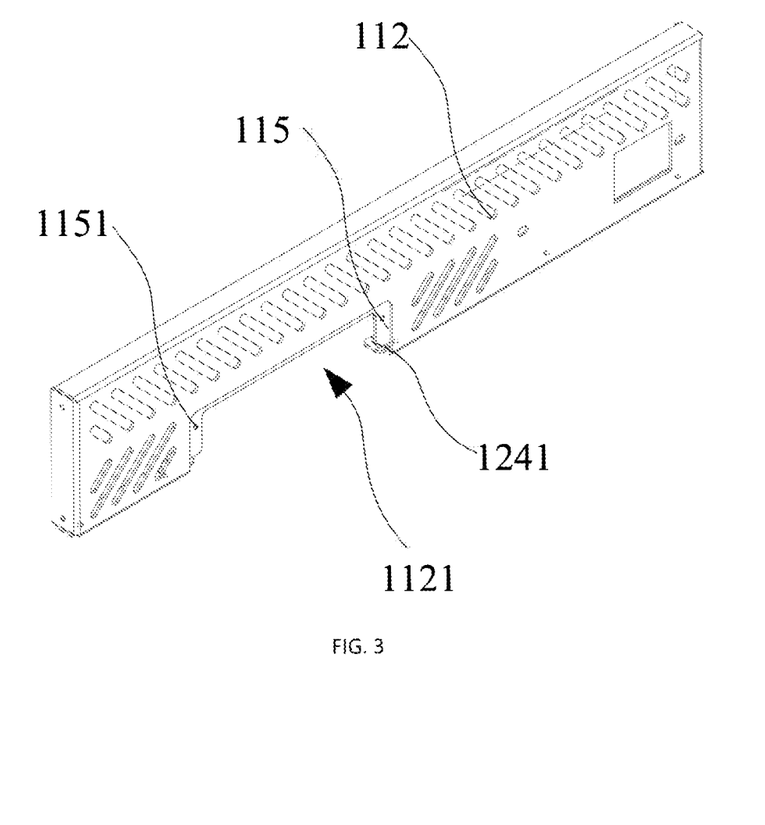
FIG. 3 is a three-dimensional view of a first end plate of the supercomputing server shown in FIG. 2.

In an embodiment, as shown in FIG. 3, the case housing 110 further includes a backplane 115. The backplane 115 is disposed on an inner wall of the mounting hole 1121. The backplane 115 partially corresponds to the second plate body 1222, and the backplane 115 is detachably coupled to the second plate body 1222. The backplane 115 is used to implement the coupling between the first end plate 112 and the second plate body 1222 to ensure that the fix plate 122 is reliably fixed to the first end plate 112 to prevent the position of the control unit 120 from changing during the use of the supercomputing server 100. Moreover, the backplane 115 can further limit the position of the second plate body 1222, so as to prevent the second plate body 1222 from excessively moving toward the inside of the case housing 110 to ensure the performance.

The backplane 115 is located on the inner wall of the mounting hole 1121 and is disposed protruding away from the inner wall of the mounting hole 1121. Projections of the backplane 115 and the second plate body 1222 onto the first end plate 112 are partially overlapped. When the fix plate 122 drives the control board 121 to move toward the accommodating space, the backplane 115 may restrict the second plate body 1222 from entering the accommodating space through the mounting hole 1121. The backplane 115 may further be detachably coupled to the second plate body 1222. Further, a threaded hole 1151 is provided in the backplane 115, and a fixed hole is provided at a corresponding position of the second plate body 1222. The fix element 123 is mounted to the second plate body 1222 and the backplane 115 through the fixed hole and the threaded hole 1151, so that the fix plate 122 is fixed relative to the first end plate 112.

Optionally, the backplane 115 and the first end plate 112 are integrally formed. Certainly, in other embodiments of the present application, the backplane 115 and the first end plate 112 may be detachably coupled or coupled by welding or the like.

In an embodiment, the control unit 120 further includes a guide assembly 124. The guide assembly 124 is respectively disposed on an inner wall of the mounting hole 1121 and the fix plate 122, and is configured to guide the movement of the fix plate 122 into or out of the mounting hole 1121. The guide assembly 124 may guide the movement of the control unit 120 when passing through the mounting hole 1121 to prevent the control unit 120 from being deflected and affecting the movement of the control unit 120 into or out of the accommodating space when passing through the mounting hole 1121.

Specifically, when the control board 121 needs to be maintained, the control unit 120 is pulled out through the mounting hole 1121, and the fix plate 122 is moved out of the mounting hole 1121 along the guide assembly 124, so that the control board 121 can be moved out of the accommodating space along a predetermined track. After the maintenance of the control board 121 is completed, the fix plate 122 is pushed, and thus drive the control board 121, to move along the guide assembly 124 to push the control unit 120 into the accommodating space according to a predetermined trajectory. In this way, it can be ensured that the control unit 120 is pulled out and pushed in along accurate trajectories, friction with the first end plate 112 is avoided, the maintenance efficiency is improved, and the operation is simple and convenient.

In an embodiment, as shown in FIG. 2, the guide assembly 124 includes a first guide member 1241 and a second guide member 1242. The first guide member 1241 is disposed on the inner wall of the mounting hole 1121. The second guide member 1242 is disposed on an edge of the first plate body 1221. The first guide member 1241 slidably fits the second guide member 1242. The first guide member 1241 is used in cooperation with the second guide member 1242 to guide the movement of the fix plate 122.

Specifically, the first guide member 1241 is disposed on the inner wall of the mounting hole 1121. The second guide member 1242 is located on the edge of the first plate body 1221. When the fix plate 122 needs to be moved into the mounting hole 1121, the second guide member 1242 is first mounted to the first guide member 1241, and then the fix plate 122 is pushed to an inner side of the case housing 110. The fix plate 122 may be slid into the accommodating space along the first guide member 1241 through the second guide member 1242 to push the control unit 120 into the case housing 110. When the control board needs to be maintained, the fix plate 122 is dragged outward, and the fix plate 122 is slid along the first guide member 1241 through the second guide member 1242, so that the fix plate 122 may drive the control board 121 to move out of the accommodating space.

It is to be noted that the first guide member 1241 and the second guide member 1242 may guide the movement of the fix plate 122 in the mounting hole 1121 to avoid the deflection of the movement trajectory of the fix plate 122. Moreover, the cooperation of the first guide member 1241 and the second guide member 1242 can further reduce the friction when the fix plate 122 moves into or out of the mounting hole 1121, to facilitate the mounting and disassembly of the control unit 120.

It is to be noted that in principle, the types of the first guide member 1241 and the second guide member 1242 are not limited, as long as the movement of the fix plate 122 can be guided. Alternatively, the first guide member 1241 is a guide chute provided in the inner wall of the mounting hole 1121; the second guide member 1242 is a guide rail which is movably mounted in the guide chute. Alternatively, the first guide member 1241 is a slide block, and the second guide member 1242 is a guide rail which is movably mounted to the slide block. Alternatively, the first guide member 1241 is a guide rail, and the second guide member 1242 is a guide chute which is disposed on the inner wall of the mounting hole 1121, and the guide rail is movably mounted in the guide chute. Certainly, in other embodiments of the present application, the first guide member 1241 and the second guide member 1242 may be any other components that can implement a guide fit.

Here in the present application, descriptions will be made merely with an example in which the first guide member 1241 is a slide block and the second guide member 1242 is a slide rail. The slide block of the first guide member 1241 is configured in a C shape, and the second guide member 1242 is mounted in a C-shaped chute of the first guide member 1241 and can slide along the first guide member 1241. The second guide member 1242 is guided by the first guide member 1241 to ensure the reliable movement of the fix plate 122. Moreover, the second guide member 1242 is located on the edge of the first plate body 1221, and is integrally formed with the first plate body 1221.

In an embodiment, the backplane 115 is disposed on the inner wall of the mounting hole 1121 to limit a movement stroke of the fix plate 122. To avoid excessive movement of the fix plate 122 into the accommodating space which would otherwise cause the second plate body 1222 to form a depression on the first end plate 112, in the present application, the fix plate 122 is limited by the backplane 115. In this way, after the control unit 120 is mounted on the case housing 110, the fix plate 122 is attached to the backplane 115. During specific mounting, after the second guide member 1242 is mounted on the first guide member 1241, the first plate body 1221 may gradually slide into the accommodating space through the cooperation between the second guide member 1242 and the first guide member 1241 until the second plate body 1222 abuts against the backplane 115 and the second plate body 1222 stops moving, indicating that the control unit 120 is mounted in place.

Certainly, in other embodiments of the present application, a limit member is further provided on the first end plate 112. The limit member is disposed on the first guide member 1241 and is located at an outer side of the accommodating space. The limit member is disposed abutting against the fix plate 122 to limit the movement stroke of the fix plate 122. The limit member can further limit the movement stroke of the fix plate 122. As such, after the control unit 120 is mounted to the case housing 110, there is still a certain spacing between the fix plate 122 and the backplane 115 to prevent the fix plate 122 from being attached to the backplane 115 and affecting the disassembly of the fix plate 122.

Alternatively, the limit member is disposed on the first guide member 1241 and protrudes toward the outer side of the accommodating space. It is to be understood that the limit member may be a limit column, a limit boss, or the like, and can be disposed on the first guide member 1241. Certainly, in other embodiments of the present application, the limit member can be integrated on the first guide member 1241 which is configured to protrude from the backplane 115 when the first guide member 1241 is mounted in place, and as such the fix plate 122 is limited by the first guide member 1241.

In an embodiment, as shown in FIG. 4, penetrating through holes 12221 are provided in the second plate body 1222. The through holes 12221 correspond to an external interface 1211 of the control board 121 and electronic device(s). It is to be understood that the control board 121 needs to interact with the outside when working. The control board 121 implements the interaction with the outside through the through holes 12221 in the second plate body 1222. The through holes 12221 may be configured to penetrate the second plate body 1222 and allow communication between the space at an inner side and the space at an outer side of the second plate body 1222. The external interface 1211 of the control board 121 and electronic devices, such as an indicator light 1212, a switch 1213, and the like may be exposed through the through holes 12221. In this way, a user may insert a network cable into the external interface 1211 through a through hole 12221, operate the switch 1213 through a through hole 12221, and observe the operation of the supercomputing server 100 through the indicator light 1212.

Alternatively, one through hole 12221 may be used. The external interface 1211 of the control board 121 and the electronic device(s) are exposed through a through hole 12221 of a relatively large size. Certainly, there may be a plurality of through holes 12221 employed, and each component may correspond to one through hole 12221.

According to the supercomputing server 100 of the present application, during the maintenance of the control unit 120, the fix element 123 is manually loosened, the control unit 120 is pulled out through the mounting hole 1121, and the fix plate 122 is dragged to drive the control board 121 to be moved out of the accommodating space. After the control unit 120 is pulled out, the cable connector(s) on the control board 121 is/are unplugged, and the control board 121 can be removed so as to maintain the control board 121. After the maintenance of the control board 121 is completed, the fix plate 122 is mounted with use of the second guide member 1242 in cooperation with the first guide member 1241. The cable connector(s) is/are inserted into the control board 121. The fix plate 122 is then pushed into the accommodating space through the mounting hole 1121 until the fix plate 122 touches the limit member, indicating that the fix plate 122 is mounted in place. Then, the fix plate 122 is fixed by the fix element 123.

A pull-out type control unit 120 is used for the supercomputing server 100. The control unit 120 can be quickly disassembled without the aid of tools, and the control unit 120 can be moved into or out of the accommodating space through the mounting hole 1121, thereby resolving the problem of complex operations of the prior arts caused by that a supercomputing server needs to be disassembled to take out the control board for maintenance of the control board, simplifying the maintenance process of the control unit 120, and facilitating the maintenance of the control unit 120. Moreover, when the control unit 120 is maintained, it is not necessary to disassemble the case housing 110 of the supercomputing server 100, so that the maintenance process is simplified, the maintenance efficiency is improved, and the easiness for use by the user is facilitated.

The technical features in the foregoing embodiments may be arbitrarily combined. For concise description, not all possible combinations of the technical features in the embodiments are described. However, these combinations of the technical features are intended to be embraced within the scope described in this specification, as long as the combining of the technical features does not present any confliction.

The foregoing specific and detailed embodiments merely express several implementations of the present application, and shall not be considered as limitations to the scope of the present application. It is to be noted that various changes and modifications can be made by those of ordinary skills in the art without departing from the spirits of the present application, and are intended to be embraced within the protection scope of the present application. Therefore, the scope of this patent disclosure is merely subject to the scope of the appended claims.

What is claimed is:

1. A supercomputing server comprising:
    a case housing defining an accommodating space and comprising at least a first end plate, the first end plate provided with a mounting hole allowing communication between the accommodating space and an external environment; and
    a control unit disposed at an end portion of the case housing corresponding to the mounting hole and configured to be moved into or out of the accommodating space through the mounting hole,
    wherein the control unit comprises a control board and a fix plate, the control board is disposed to the fix plate, the fix plate is detachably coupled to the first end plate, and the fix plate is configured to drive the control board to be moved into or out of the accommodating space along the mounting hole.

2. The supercomputing server according to claim 1, wherein the case housing further comprises a case bottom shell, a second end plate, and a case cover plate, the first end plate and the second end plate are disposed oppositely to each other at two sides of the case bottom shell and cover three side edges of the case bottom shell that are coplanar and connected in sequence, the case cover plate is coupled to the case bottom shell, the first end plate, and the second end plate in an enclosed manner to define the accommodating space, and the mounting hole is provided in the first end plate.

3. The supercomputing server according to claim 1, wherein the fix plate comprises a first plate body and a second plate body that are vertically arranged, the control board is mounted on the first plate body, and the second plate body is detachably coupled to the first end plate.

4. The supercomputing server according to claim 3, wherein the case housing further comprises a backplane, the backplane is disposed on an inner wall of the mounting hole, the backplane partially corresponds to the second plate body, and the backplane is detachably coupled to the second plate body.

5. The supercomputing server according to claim 1, wherein the control unit further comprises a guide assembly, and the guide assembly is respectively disposed on an inner wall of the mounting hole and on the fix plate and is configured to guide the moving of the fix plate into or out of the mounting hole.

6. The supercomputing server according to claim 5, wherein the guide assembly comprises a first guide member and a second guide member, the first guide member is disposed on the inner wall of the mounting hole, the second guide member is disposed on an edge of the fix plate, and the first guide member slidably fits the second guide member.

7. The supercomputing server according to claim 6, wherein the first guide member is a guide chute, the second guide member is a guide rail, and the guide rail is movably mounted in the guide chute; or
    the first guide member is a slide block, the second guide member is a guide rail, and the guide rail is movably mounted to the slide block; or
    first guide member is a guide rail, the second guide member is a guide chute, and the guide rail is movably mounted in the guide chute.

8. The supercomputing server according to claim 6, wherein a limit member is further provided on the first end plate, the limit member is disposed on the first guide member and is located at an outer side of the accommodating space, and the limit member is disposed abutting against the fix plate to limit a movement stroke of the fix plate.

9. The supercomputing server according to claim 3, wherein a through hole penetrating the second plate body is provided in the second plate body, and the through hole corresponds to an external interface of the control board and an electronic device.

10. The supercomputing server according to claim 1, wherein the supercomputing server further comprises electronic units mounted in the accommodating space of the case housing; and the electronic units comprise a computation board and a power supply, and the computation board and the power supply are respectively electrically coupled to the control unit with connecting cables.

11. The supercomputing server according to claim 1, wherein the control unit further comprises a fix element, the fix element is mounted onto the first end plate through the fix plate, and the fix plate is detachably coupled to the first end plate.

12. The supercomputing server according to claim 3, wherein the first plate body is disposed in parallel to a bottom plate of the case bottom shell, and the second plate body is disposed in parallel to the first end plate.

13. The supercomputing server according to claim 4, wherein the backplane is disposed protruding away from the inner wall of the mounting hole, and projections of the backplane and the second plate body on the first end plate are partially overlapped.

14. The supercomputing server according to claim 8, wherein the limit member is disposed, on the first guide member and protrudes toward the outer side of the accommodating space.

* * * * *